United States Patent [19]

Limbacher et al.

[11] Patent Number: 5,052,279
[45] Date of Patent: Oct. 1, 1991

[54] HYDRAULIC CYLINDER FOR A HYDRAULIC ACTUATION ARRANGEMENT OF A MOTOR VEHICLE FRICTION CLUTCH

[75] Inventors: Bernhard Limbacher; Kurt Fädler, both of Niederwerrn, Fed. Rep. of Germany

[73] Assignee: Fichtel & Sachs AG, Schweinfurt, Fed. Rep. of Germany

[21] Appl. No.: 525,100

[22] Filed: May 17, 1990

[30] Foreign Application Priority Data

May 19, 1989 [DE] Fed. Rep. of Germany ....... 3916317

[51] Int. Cl.⁵ .......................... F01B 11/00; F16J 10/00
[52] U.S. Cl. ..................................... 92/169.1; 92/248; 60/533
[58] Field of Search ................. 92/169.1, 169.2, 169.3, 92/169.4, 171.1, 248, 130 R

[56] References Cited

U.S. PATENT DOCUMENTS

| | | | |
|---|---|---|---|
| 2,282,502 | 5/1942 | Suth | 92/171.1 |
| 3,678,811 | 7/1972 | Penwell | 92/169.1 |
| 3,743,448 | 7/1973 | Dorn | 92/171.1 |
| 3,918,351 | 11/1975 | Finke | 92/169.1 |
| 4,562,798 | 1/1986 | Van Os | 92/169.1 |
| 4,577,549 | 3/1986 | Frank et al. | 92/169.1 |
| 4,771,605 | 9/1988 | Kytta | 92/169.4 |
| 4,867,044 | 9/1989 | Holtrop | 92/169.1 |
| 4,872,396 | 10/1989 | Wimbush | 92/169.1 |
| 4,930,403 | 6/1990 | Husted | 92/169.1 |

FOREIGN PATENT DOCUMENTS

| | | |
|---|---|---|
| 3431115 | 3/1986 | Fed. Rep. of Germany . |
| 3436312 | 4/1986 | Fed. Rep. of Germany . |
| 1300938 | 7/1962 | France .............. 92/171.1 |
| 2254729 | 7/1975 | France . |
| 2623255 | 5/1989 | France . |
| 0802662 | 2/1981 | U.S.S.R. ............ 92/171.1 |
| 1051512 | 12/1966 | United Kingdom . |
| 1065598 | 4/1967 | United Kingdom . |
| 1455316 | 11/1976 | United Kingdom . |
| 1481612 | 8/1977 | United Kingdom . |
| 1539879 | 2/1979 | United Kingdom . |
| 2033536 | 5/1980 | United Kingdom ....... 92/171.1 |
| 2099094 | 12/1982 | United Kingdom . |
| 2182410 | 5/1987 | United Kingdom . |

Primary Examiner—Edward K. Look
Assistant Examiner—Thomas Denion
Attorney, Agent, or Firm—Toren, McGeady & Associates

[57] ABSTRACT

For a hydraulic actuation arrangement of a motor vehicle friction clutch a hydraulic cylinder is proposed of which the cylinder, displaceably receiving a piston (7), consists of a synthetic plastics material moulding (3) and a tube piece (5) of metal arranged in the moulding (3) and guiding the piston (7). The tube piece (5) is cut off from a semi-finished tube and guided with axial play, but with resilient initial stress, in the moulding (3). Seals (27, 49) arranged at the ends of the tube part (5) seal the tube part (5) off from the moulding (3).

4 Claims, 1 Drawing Sheet

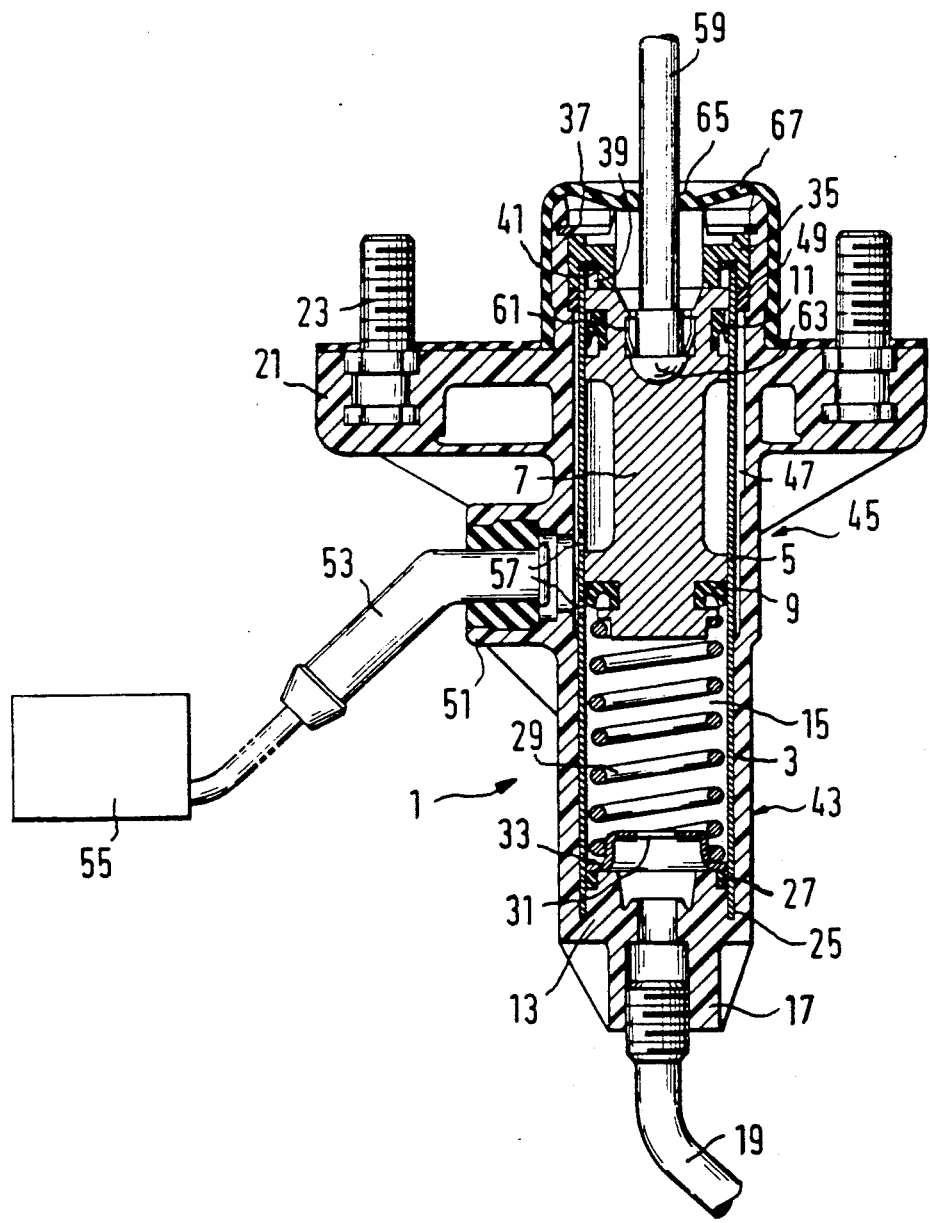

5,052,279

HYDRAULIC CYLINDER FOR A HYDRAULIC ACTUATION ARRANGEMENT OF A MOTOR VEHICLE FRICTION CLUTCH

BACKGROUND OF THE INVENTION

The invention relates to a hydraulic cylinder for a hydraulic actuation arrangement inparticular of a motor vehicle friction clutch.

Conventional master or slave cylinders of hydraulic actuation arrangements of motor vehicle friction clutches usually have a cylinder consisting of cast iron, spheroidal graphite cast iron or die-cast light metal, in which a piston is displaceable in sealed manner along the cylinder axis. The piston together with the cylinder limits a hydraulic pressure chamber which is connected by way of a hydraulic terminal on the cylinder end wall adjoining the pressure chamber, and a hydraulic conduit connected thereto is connected with the other cylinder in each case of the actuation arrangement. Conventional hydraulic cylinders are comparatively heavy and require relatively high manufacturing expense, since a plurality of surfaces and elements of the casting which forms the cylinder must be subjected to finishing work.

Thus the invention is directed to provide a hydraulic cylinder for a hydraulic actuation arrangement of a motor vehicle friction clutch which can be produced with power manufacturing expense and thus at more favourable cost than hitherto, and nevertheless is secure in function over a long operating duration.

SUMMARY OF THE INVENTION

The cylinder part of the hydraulic cylinder according to the invention, which is usable equally well as master cylinder or as slave cylinder, is formed as a synthetic plastics material moulding, which encloses a cylindrical tube piece of metal, guiding the piston and radially defining the hydraulic pressure chamber. The synthetic plastics material moulding is integrally provided with the securing elements and the hydraulic connector of the pressure chamber, and forms the end wall which axially seals the tube piece. The tube piece is a part which can be prefabricated from semi-finished tube with high accuracy of fit and at low cost.

Hydraulic cylinders for clutch actuation arrangements have a comparatively long piston stroke. Correspondingly the tube piece is comparatively long, which can lead to noticeably different thermal expansions of the tube piece for the one part and of the moulding for the other, and thus to hydraulic leakages. Sealing problems of this kind are avoided by a preferred development in which the tube piece is sealed off against the moulding in the region of the end wall by an elastic ring seal. The ring seal is expediently arranged in a ring groove of the end wall open to the hydraulic pressure chamber, and rests on the inner side of the tube piece. The hydraulic pressure thus acts upon the ring seal and increases its pressure application force For the axial fixing of the ring seal a return spring arranged axially between the piston and the end wall of the moulding can be exploited. A guide part with which the return spring is supported on the end wall in this case expediently overlaps the ring groove.

The tube piece can be surrounded by injection in the production of the synthetic plastics material moulding in a compound process. In order better to be able to compensate for the above-mentioned thermal expansions of the tube piece and of the moulding, in a preferred form of execution the moulding is however separately produced. The tube piece, which is only subsequently fitted into the moulding, is guided movably in the moulding with axial play between two axial stop faces. Between a first one of the stop faces and the tube piece there is arranged a spring element which stresses the tube piece resiliently against the second stop face. The axial play permits of compensating different thermal expansions. The spring element ensures an operationally correct axial fixing of the tube piece, even against the displacement forces caused by the piston friction. The tube piece and the axially acting annular spring can be fitted comparatively simply if on the side of the tube piece remote from the end wall of the moulding a ring part is arranged in the moulding and fixed axially for example with a securing ring. The spring element can then be formed as an axially acting annular spring, for example as a corrugated springs and arranged axially between the ring part and one end of the tube piece. The annular spring will expediently be arranged in a ring groove of the ring part axially open to the piston. The ring groove fixes the annular spring in the radial direction and the ring part can furthermore be used as end stop for the piston.

In the cause of simpler production the piston is also expediently formed as a synthetic plastics material part, preferably in the form where its piston rod is coupled with the piston through a snap connection. Thus the piston rod can be articulatedly connected with the piston and at the same time exert traction forces upon the piston.

In a preferred development it is provided that the moulding encloses the tube piece in closely fitting manner in a first region axially adjoining the end wall, and in a second region placed axially between the first region and the end of the tube piece remote from the end wall extends with radial spacing from the tube piece and forms an annular space between the tube piece and the moulding. Such a configuration of the moulding not only facilitates removal from the mould during production, since long cylinder regions are avoided, but also renders possible the connection of the hydraulic pressure chamber to a compensator conduit if the hydraulic cylinder is used as master cylinder of the clutch actuation arrangement. For this purpose the moulding can especially be provided integrally with a connection, connected with the annular chamber, for the hydraulic compensation conduit, while the tube piece comprises at least one passage opening leading to the annular chamber.

The various features of novelty which characterize the invention are pointed out with particularity in the claims annexed to, and forming part of, this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

The drawing shows an example or embodiment of a master cylinder for a clutch actuation arrangement of a motor vehiclele friction clutch

DESCRIPTION OF PREFERRED EMBODIMENTS

The master cylinder has a cylinder designated generally by 1, which contains a cylindrical tube piece 5 consisting of metal, in a synthetic plastics material moulding 3. In the tube piece 5 there is axially displaceably guided a piston 7 which is sealed by annular lip seals 9, 11 against the inner surface of the tube piece 5 and together with the tube piece 5 and an end wall 13 of the moulding 3, which closes off the end of the tube piece 5, limits a pressure chamber 15. The end wall 13 is provided with a connector 17 for a hydraulic conduit 19 leading to the slave cylinder of the clutch actuation arrangement.

The synthetic plastics material moulding 3 is a part produced for example by the injection-moulding process, to which the connector 17 and a securing flange 21 with cast-in securing bolts 23 are integrally formed The tube piece 5 is cut from a precisely manufactured semi-finished tube and inserted subsequently y into the moulding 3. It engages with its tube adjacent to the end wall 13 in a ring groove 25 open to the pressure chamber 15, which groove widens on the inner side of the tube piece 5 and in the widened part contains a ring seal 27. The ring seal 27 seals off the tube part 5, axially movably seated in the moulding 3, on the inner side thereof, to the end wall 13. The ring seal 27 lies open to the pressure chamber 15, so that the hydraulic pressure of the pressure chamber 15 increases the pressing of the ring seal 27. Between the end wall 13 and the piston 7 a return spring 29 is arranged in the form of a helical compression spring which stresses the piston 7 into its position allocated to the disengaged position of the friction clutch and placed remotely from the end wall 13. The return spring 29 is guided radially on a ring part 33 provided with a central opening 31, which ring part radially overlaps the ring groove 25 and axially fixes the ring seal 27.

On the side of the tube piece 5 axially remote from the end wall 13 a ring part 35 is inserted into the moulding 3 and is axially fixed on the side remote from the tube piece 5 by a securing ring 37. An axially resilient corrugated ring 41, which stresses the tube piece 5 towards the end wall 13, is seated in a groove 39 of the ring part 35 in which the tube piece 5 engages with axial play. The axial play compensates for thermal expansion differences between the tube piece 5 and the moulding 3. The ring part 35 at the same time forms an end stop for the piston 7.

The tube piece 5 is seated in a first region 43 of the moulding 3, directly adjoining the end wall 13, fitting radially closely in the moulding 3. In a second region 45 adjoining this and reaching approximately as far as the ring part 35, the moulding 3 surrounds the tube piece 5 with radial spacing, forming an annular chamber 47. A ring seal 49 surrounding the tube piece 5 on the exterior seals off the annular chamber 47 to the exterior. The annular chamber 47 for the one part facilitates the removal of the moulding 3 from the mould, in its production, and for the other part opens into a connector piece 51 formed integrally on the moulding 3, to which connector piece 51 a hydraulic compensation vessel 55 can be connected through a conduit 53. The annular chamber 47 is connected through several passage openings 57 of the tube piece 5 with the tube interior. At least one of the passage openings 57 lies in the pressure chamber 15, when the piston is fully retracted, and in the usual way permits a compensation of thermal expansion of the hydraulic fluid. On pressure actuation of the hydraulic cylinder the passage openings 57 are sealed off by the lip seal 9 of the piston 7 from the pressure chamber 15.

On the side remote from the pressure chamber 15 the piston 7 is provided with a piston rod 59 which is coupled by a snap coupling 61 fast in traction with the piston 7 and acts, through a ball head 63, articulatedly in the pressure direction upon the piston 7. An elastic dust cap 67 resting with scraper lips 65 on the piston rod 59 seals off the moulding 3 to the exterior. It remains to be mentioned that the piston 7 consists of synthetic plastics material.

The connector piece 51 for the pressure compensating conduit 53, including the passage openings 57, is eliminated if the hydraulic cylinder is used as slave cylinder of the clutch actuation arrangement.

While specific embodiments of the invention have been shown and described in detail to illustrate the application of the inventive principles, it will be understood that the invention may be embodied otherwise without departing from such principles.

What we claim is:

1. A hydraulic cylinder for a hydraulic actuation arrangement of a motor vehicle friction clutch, comprising:
   a plastics material molded part (3) provided with securing elements (21);
   a metal cylindrical tubular piece (5) having an axis and being movably guided with tolerance in the molded part (3) in the direction of the cylinder axis, the tubular piece (5) being arranged with its end faces between two axial step faces;
   a piston (7) displaceable in the tubular piece (5) along its cylinder axis in a sealed manner, the piston together with the tubular piece (5) and an end wall (13) of the molded part (3) provided with a hydraulic connection (17) defining a hydraulic pressure chamber (15);
   a ring seal (27) arranged so as to seal the tubular piece (5) against the molded part (3) in the region of the end wall (13) of the molded part (3); and
   a spring element (41) arranged between a first of the two stop faces and the tubular piece (5) so as to stress the tubular piece (5) resiliently against the second stop face.

2. A hydraulic cylinder according to claim 1, wherein in the ring seal (27) is arranged in a ring groove (25) open to the hydraulic pressure chamber (15), of the end wall (13) and rests on the interior of the tubular piece (5), and further comprising a return spring (29) arranged axially between the piston (7) and the end wall (13) of the molded part (3) and supported by a guide part (33) on the end wall (13) the guide part (33) radially overlapping the ring groove (25) for axially fixing the ring seal (27).

3. A hydraulic cylinder according to claim 1 wherein on the side of the tubular piece (5) remote from the end wall (13) of the molded part (3), a ring part (35) is arranged and axially fixed in the molded part (3) and wherein the spring element is formed as an axially acting annular spring (41) and is arranged axially between the ring part (35) and one end of the tubular piece (5).

4. A hydraulic cylinder according to claim 3, wherein the annular spring (41) is arranged in a ring groove (39), axially open to the piston (7), of the ring part (35) and wherein the ring part (35) forms and end stop for the piston (7).

* * * * *